(12) United States Patent
Abhishek et al.

(10) Patent No.: US 10,560,207 B2
(45) Date of Patent: Feb. 11, 2020

(54) SYSTEM AND METHOD FOR PROVIDING TARGETED SECONDARY CONTENT DELIVERY

(71) Applicant: NAFFA INNOVATIONS PRIVATE LIMITED, Bangalore (IN)

(72) Inventors: Kumar Abhishek, Bangalore (IN); Ibrahim Sankadal, Bangalore (IN); Nishant Pashine, Bangalore (IN)

(73) Assignee: NAFFA INNOVATIONS PRIVATE LIMITED, Karnataka (IN)

( * ) Notice: Subject to any disclaimer, the term of this patent is extended or adjusted under 35 U.S.C. 154(b) by 0 days.

(21) Appl. No.: 16/324,863

(22) PCT Filed: Aug. 10, 2017

(86) PCT No.: PCT/IN2017/050338
§ 371 (c)(1),
(2) Date: Feb. 11, 2019

(87) PCT Pub. No.: WO2018/029708
PCT Pub. Date: Feb. 15, 2018

(65) Prior Publication Data
US 2019/0229822 A1      Jul. 25, 2019

(30) Foreign Application Priority Data

Aug. 10, 2016  (IN) .............................. 201641027396

(51) Int. Cl.
*H04H 20/31*  (2008.01)
*H04H 60/37*  (2008.01)
(Continued)

(52) U.S. Cl.
CPC ......... *H04H 20/31* (2013.01); *G06F 16/2255* (2019.01); *H04H 60/37* (2013.01);
(Continued)

(58) Field of Classification Search
CPC ....................................................... H04N 2/812
(Continued)

(56) References Cited

U.S. PATENT DOCUMENTS

| 2010/0280641 A1* | 11/2010 | Harkness | H04H 20/31 700/94 |
| 2013/0170813 A1* | 7/2013 | Woods | H04N 5/765 386/200 |

(Continued)

*Primary Examiner* — Jefferey F Harold
*Assistant Examiner* — Sihar A Karwan
(74) *Attorney, Agent, or Firm* — Barry Choobin; Patent 360 LLC

(57) ABSTRACT

A method for facilitating targeted secondary content delivery to a user is envisaged. The primary content is broadcast on a television accessible to a user, followed by targeted delivery of relevant secondary content onto a handheld device of the user. The secondary content deemed as being relevant to the primary content is delivered in an unobtrusive manner without altering the viewing experience of the primary content, only after verification of the viewership of the primary content. The secondary content deemed as relevant to the primary content is transmitted to a handheld device accessible to the user thereby not altering the viewing experience corresponding to the viewing of the primary content on the television. The secondary content is delivered to the handheld device via electromagnetic waves, preferably radio waves without necessitating an active internet connection for the handheld device, and without necessitating the user to remain logged-on to the handheld device.

13 Claims, 3 Drawing Sheets

Figure 1A:
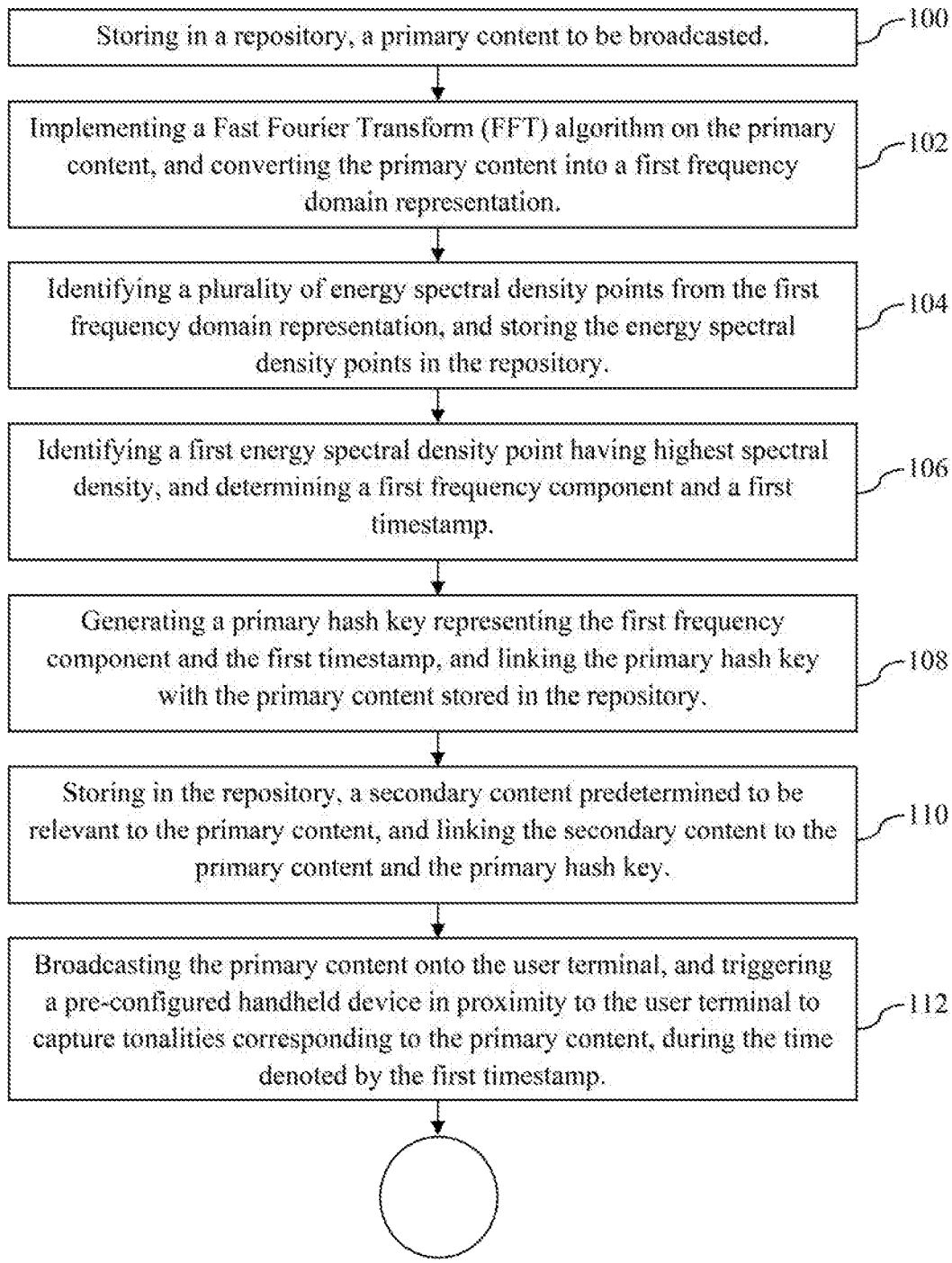

(51) Int. Cl.
*H04N 21/81* (2011.01)
*H04H 60/80* (2008.01)
*H04N 21/41* (2011.01)
*H04N 21/462* (2011.01)
*G06F 16/22* (2019.01)

(52) U.S. Cl.
CPC ........ *H04H 60/80* (2013.01); *H04N 21/4126* (2013.01); *H04N 21/4622* (2013.01); *H04N 21/812* (2013.01)

(58) Field of Classification Search
USPC .......................................................... 725/9
See application file for complete search history.

(56) References Cited

U.S. PATENT DOCUMENTS

| | | | |
|---|---|---|---|
| 2014/0080428 A1* | 3/2014 | Rhoads | H04W 4/70 455/88 |
| 2015/0264627 A1* | 9/2015 | Perdomo | H04W 40/12 370/329 |
| 2018/0131975 A1* | 5/2018 | Badawiyeh | H04N 21/23424 |
| 2019/0281349 A1* | 9/2019 | Harkness | H04H 20/31 |

* cited by examiner

SYSTEM AND METHOD FOR PROVIDING TARGETED SECONDARY CONTENT DELIVERY

CROSS-REFERENCE TO RELATED APPLICATIONS

This Patent Application is a National Phase Application corresponding to the PCT Application No. PCT/IN2017/050338 filed on Aug. 10, 2017 with the title "SYSTEM AND METHOD FOR PROVIDING TARGETED SECONDARY CONTENT DELIVERY". This Patent Application claims the priority of the Indian Provisional Patent Application No. 201641027396 filed on Aug. 10, 2016 with the title "A SYSTEM AND METHOD FOR CONTENT INTERACTION USING AUDIO SIGNALS", the contents of which is included herein by the way of reference.

TECHNICAL FIELD

The present disclosure relates to targeted delivery of secondary content deemed relevant to primary television content. Particularly, the present disclosure relates to delivering secondary content to the user in the form of electromagnetic waves.

BACKGROUND

Given the recent technological advancements witnessed in the domains of communication technology and consumer electronics, personal communication devices such as mobile phones and home entertainment devices such as televisions are being continuously redesigned to incorporate a wide range of functionalities. Availability of a wide range of previously unavailable functionalities has transformed televisions from electronic devices that merely relayed the broadcasted content to intelligent electronic devices that make an informed decision about the content to be relayed to the users, based on the choices and preferences of the users.

It has been established that despite the upsurge on online entertainment, televisions and the conventional broadcasting medium with which the televisions coexist remain the preferred choice of entertainment for a majority of the users. Given the fact that the television remains the most preferred choice of entertainment for a majority of users, product manufactures and service providers prefer using television broadcasts as a medium for advertising their products and services respectively.

However, one of the challenges that most of the advertisers come across while broadcasting advertisements on a televisions channel is ensuring that the advertisements broadcasted during the broadcast of entertainment program do not exhibit a negative impact on the users' overall television viewing experience. Further, it is also necessary for the advertisers to decide on the best possible positioning of advertisements within an ongoing television program, by taking into consideration the level of relevance between the advertised products/services and the television program. Further, the advertisements would be more effective if they are telecasted only after determining whether a user has actually exhibited interest in a television program that is at least partially relevant to the advertisement. For instance, advertising 'beauty products' to a user who has exhibited a keen interest in watching 'beauty pageants' might turn out to be an effective and beneficial advertisement strategy.

Similarly, television viewers are likely to positively respond to advertisements or any secondary content broadcasted on a television, only when the advertisements/secondary content are broadcasted in an unobtrusive manner and in a manner so as to not affect the overall television viewing experience. Typically, advertisements are broadcasted by inserting advertisement slots in the broadcast schedule for television programs. Further, any secondary content, such as promotional otters corresponding to a television program, hyperlinks for providing a feedback on a television program, hyperlinks for completing a monetary transaction for purchasing a product/service described during the television program, are superimposed in real-time on the display of the television program. To prevent the superimposed secondary content from obstructing the display of the television program—the primary content—thereby hampering the television viewing experience of the users, certain prior art solutions envisaged transmitting secondary content to the users via either social media feed or through a dedicated web-page/dedicated mobile application. However, transmitting secondary content to the users via either social media feed or through a dedicated web-page/dedicated mobile application requires the users to avail a dedicated internet connection, and non-availability of an internet connection or intermittent internet connectivity would hamper the users' accessibility to the secondary content.

Therefore, there was felt a need for a system and method that transmits secondary content to companion device associated with users in an unobtrusive yet efficient manner, but without necessitating the users to acquire a dedicated internet connection for viewing/consuming the secondary content via the companion device.

OBJECTS

An object of the present disclosure is to facilitate active engagement of television users.

Yet another object of the present disclosure is to seamlessly transmit to the user the secondary content deemed relevant to predetermined primary content.

Still a further object of the present disclosure is to transmit the secondary content relevant to the primary content consumed by the user, in a non-obtrusive manner.

One more object of the present disclosure is to facilitate active engagement of television users by presenting them only the relevant secondary content.

Another object of the present disclosure is to transmit secondary content in the form of radio waves, thereby obviating the need for an active data connection.

One more object of the present disclosure is to facilitate display of the secondary content without either partial or complete obstruction to the broadcast of the primary content.

Yet another object of the present disclosure is to envisage a method that ensures that the viewing experience of the user is never compromised due to the display of the secondary content.

Another object of the present disclosure is to envisage a method that provides tor uninterrupted broadcast of the primary content, despite enabling the user to consume, in real-time, the secondary content deemed relevant to the primary content.

SUMMARY

The present disclosure envisages a method for providing targeted secondary content delivery to a user. The relevance of secondary content is determined based on the primary content consumed by the user through his (user) device. The 'user device' is typically a Television capable of receiving broadcast content. Prior to the broadcast the primary content is analyzed and stored in a repository for analyses. Subsequently, the primary content is converted into a corresponding frequency domain representation using a Fast Fourier Transformation (FFT) algorithm. The frequency domain representation is represented in terms of a 'spectrogram' having two axes representing 'time' (preferably, time of broadcast) and "frequency" (preferably broadcast frequency) respectively.

Subsequently, the frequency domain representation is analyzed and a plurality of high density energy points (having higher frequencies) are determined along with the respective time (of broadcast). Amongst the high density energy points, one energy density point having the highest energy density is determined, along with the corresponding time of broadcast. Subsequently, a primary hash key is generated using the energy density point having the highest energy density and the corresponding time of broadcast. The primary hash key thus generated is linked to the primary content and the secondary content.

Further, the primary content is broadcast to the user terminal (television). During the time of the broadcast, to verify the viewership of the primary content, a preconfigured handheld device (for example, a mobile phone having internet connectivity) is triggered/activated and instructed to track the broadcast of the primary content on the user terminal. The handheld device is accessible to the user and is typically located in proximity to the user terminal. The handheld device is instructed to capture at least the tonalities of the broadcast content in order to verify the viewership of the primary content. Preferably, the handheld device is triggered just-in-time to capture the tonalities corresponding to the part of the primary content identified, prior to the broadcast, as having the highest energy density point. The tonalities captured by the handheld device are transmitted to an application server, preferably a remote application server for further analyses.

The (remote) application server analyzes the tonalities captured by the handheld device, and based on the (captured) tonalities determines a secondary hash key. In order to determine the secondary hash key, the captured tonalities are converted into a frequency domain representation using a Fast Fourier Transformation (FFT) algorithm followed by rendering the frequency domain representation in the form of a 'spectrogram' having two axes representing 'time' (preferably, time of broadcast) and 'frequency' (preferably broadcast frequency) respectively. Subsequently, the frequency domain representation corresponding to the captured tonalities is analyzed and a plurality of high density energy points (having higher frequencies) are determined along with the respective time (of broadcast). Amongst the high density energy points, one energy density point having the highest energy density is determined, along with the corresponding time of broadcast. Subsequently, the secondary primary hash key is generated using the energy density point having the highest energy density and the corresponding time of broadcast.

Since the highest density points for the broadcasted primary content and the captured tonalities are similar, the secondary has key generated using the captured tonalities would also be similar to the primary hash key corresponding to the primary content. The primary hash key and the secondary hash key are compared with one another, and in the event that the similarity between the primary hash key and the secondary hash key is positively identified, in turn resulting in positive verification of the viewership of the primary content, the secondary content relevant to the primary content is transmitted, preferably in the form of electromagnetic (radio) waves, to the handheld device accessible to the user.

BRIEF DESCRIPTION OF THE ACCOMPANYING DRAWINGS

Figure 1B:
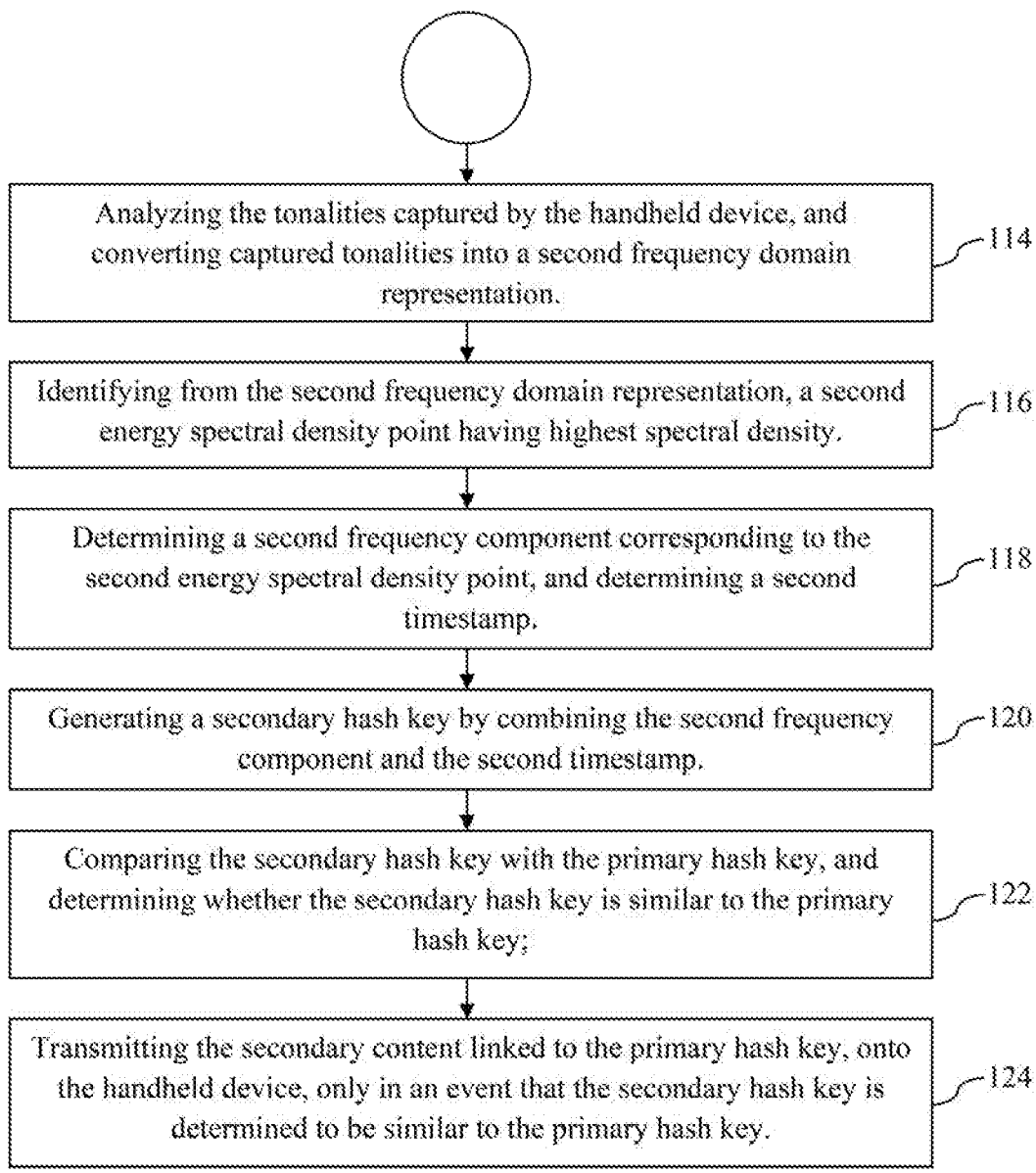
Figure 2:
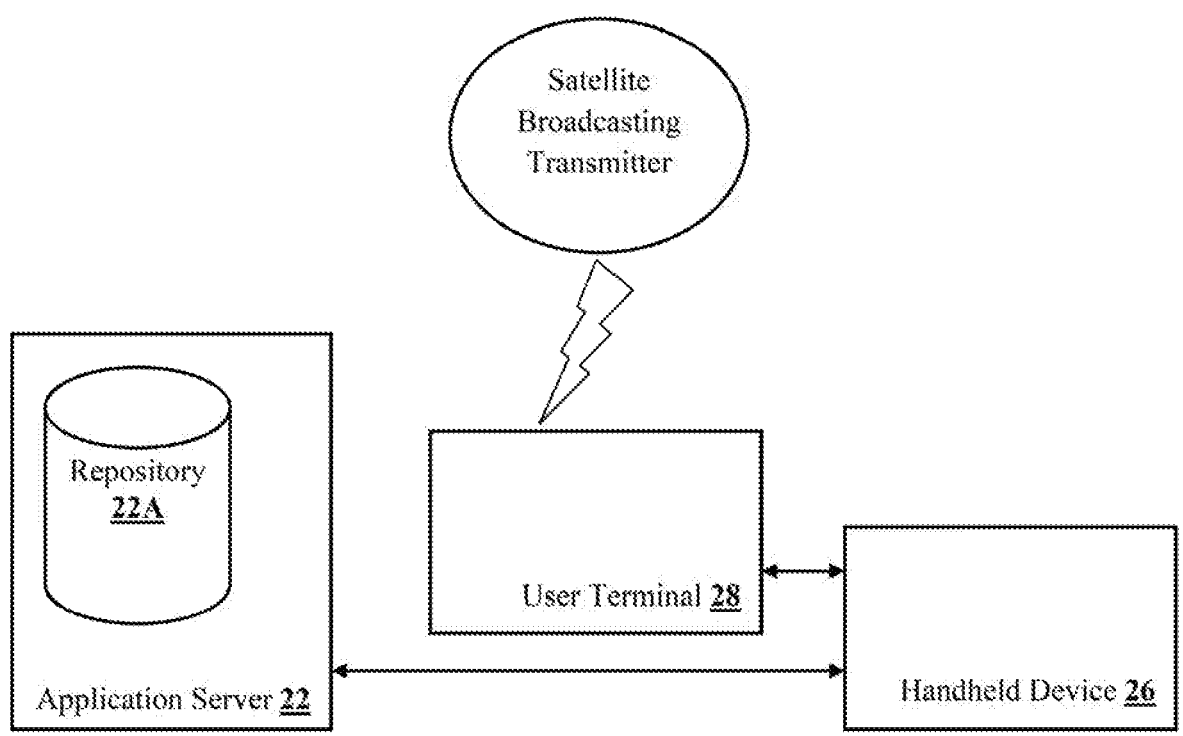

The other objects, features and advantages will be apparent to those skilled in the art from the following description and the accompanying drawings, in which:

FIG. 1A and FIG. 1B in combination illustrate a flow chart corresponding to the method for providing targeted secondary content delivery to a user, in accordance with the present disclosure; and FIG. 2 is a block diagram illustrating a system for providing targeted secondary content delivery to a user, in accordance with the present disclosure.

DETAILED DESCRIPTION

The present disclosure envisages a method for facilitating targeted secondary content delivery to a user. The secondary content in accordance with the present disclosure includes advertisements, web-based links, promotional offers, discount offers and the like pertinent to/relevant to a primary content. Typically, the primary content is broadcast on a television accessible to a user, followed by targeted delivery of relevant secondary content onto a handheld device (companion device) of the user.

In accordance with the present disclosure, the 'primary content' is any program broadcasted onto a 'broadcasting medium', with the preferred broadcasting medium being 'television broadcasting'. The primary content in accordance with the present disclosure could include but is not restricted to news, movies, serials, sports activities, religious activities, music and dance shows, and reality shows. The 'secondary content' in accordance with the present disclosure includes but is not restricted to advertisements, promotional offers, hyperlinks for providing a feedback on the primary content, and hyperlinks for completing a monetary transaction for purchasing a product/service described through the primary content. For instance, if the 'primary content' is a quiz show broadcasted on the television, the relevant/corresponding 'secondary content' would typically include any questions intended to be shared with television viewers.

In accordance with the present disclosure, the secondary content deemed as being relevant to the primary content (consumed by a user), is delivered in an unobtrusive manner without altering the viewing experience of the primary content, only after verification of the viewership of the primary content. Further, the secondary content deemed as relevant to the primary content is transmitted to a handheld device accessible to the user thereby not altering the viewing experience corresponding to the viewing of the primary content on the television. Further, the secondary content is delivered to the handheld device via electromagnetic waves, preferably radio waves without necessitating an active internet connection for the handheld device, and without necessitating the user to remain logged-on to the handheld device, which would have been the case if the 'secondary content' were to be delivered via social media or SMS or emails.

Referring to FIG. 1A and FIG. 1B in combination, there is shown a flowchart illustrating the steps involved in the method for providing targeted secondary content delivery to a user having access to a user terminal. The term 'user' in accordance with the present disclosure describes a person consuming the primary content broadcasted on a primary broadcasting medium. Further, the term 'user terminal' as used in the present disclosure refers to any electronic equipment used by the user to view/consume the primary content. The examples of electronic equipment used by the user to view/consume the primary content include television, laptop computer, desktop computer, IP enabled television and the like.

Referring again to FIG. 1, at step 100, the primary content to be broadcasted to a user terminal is identified. Subsequently, the primary content thus identified to be broadcasted onto the user terminal is stored in a repository prior to the scheduled broadcast. The repository storing the primary content prior to the broadcast is preferably hosted on a remote application server. At step 102, the primary content stored on the repository is analyzed by the application server. The application server analyzes the primary content using a Fast Fourier Transform (FFT) algorithm, and converts the primary content into a corresponding first frequency domain representation.

Typically, the 'first frequency domain representation' is the representation of the primary content in terms of the total duration of the primary content and the corresponding frequency components. For instance, a particular primary content might be represented on the 'first frequency domain representation' as having a total duration 'X', and further having 'Y' number of frequency components. The frequency components are represented as 'peaks' on the first frequency domain representation. The frequency components are unique for the primary content. Typically, the frequency components corresponding to the primary content denote the 'frequency of the sound' corresponding to the primary content.

The conversion of the primary content into the corresponding 'frequency domain representation' involves representing the 'frequency domain representation' in the form of a spectrogram having 'two' axes, with the frequency components corresponding to the sound of the primary content being represented on (preferably) a horizontal axis, and the timestamps denoting the respective broadcasting time for each of the frequency components being represented on (preferably) a vertical axis. However, it is to be noted that the use of spectrogram and orientation thereof constitutes only one of the ways of implementing the teachings of the present disclosure, and that the use of spectrogram and the orientation thereof should only be construed in an exemplary sense and not in a limiting sense.

The spectrogram represents the broadcasting frequencies corresponding to the primary content, and the timestamps denoting the respective time at which the frequency components corresponding to the primary content are broadcasted. Subsequently, at step 104, a plurality of energy spectral density points are identified from the spectrogram corresponding to the primary content, using the FFT algorithm. The spectral density points indicate the positioning of the frequency components corresponding to the primary content with reference to the timestamps indicative of the time at which each of the frequency components corresponding to the primary content are broadcasted.

On the spectrogram, the energy spectral density points incorporating comparatively higher frequency components are represented us having comparatively higher energy spectral densities. Therefore, the higher energy spectral density points on the spectrogram are consumed as points denoting comparatively higher frequency components (in comparison to the other spectral density points on the spectrogram). Subsequently, the information identifying the energy spectral density points, i.e., the frequency components and the respective timestamps, are stored in the repository.

At step 106, the information representative of the energy spectral density points is analyzed to determine a 'first' energy spectral density point having the highest spectral density amongst the plurality of energy spectral density points corresponding to the primary content. The first energy spectral density point is also considered as the point (on the spectrogram) representing the highest frequency component corresponding to the primary content. Subsequently, the timestamp corresponding to the point representing the highest frequency component is also determined. The timestamp denotes the time of broadcast of the primary content corresponding to the highest frequency component. For ease of explanation, the highest frequency component corresponding to the primary content is termed 'first frequency component' and the time-stamp corresponding to the first frequency component is termed as 'first timestamp'. The first frequency component and the first timestamp are stored in the repository.

At step 108, the first frequency component and the first timestamp are combined using well-known hash key generation techniques to generate a primary hash key. Preferably, the primary hash key is of a predetermined length (for example, 16 bit, 32 bit). The primary hash key thus generated is a combination of the first frequency component (denoting the highest frequency component corresponding to the primary content) and the first timestamp (indicative of the time at which the primary component characterized by the first frequency component would be broadcasted). The primary hash key, when subsequently analyzed by the application server, identifies the spectral energy density point on the spectrogram (corresponding to the primary content) having the highest energy density, in addition to pointing out to the highest frequency component (first frequency component) corresponding to the primary content and the timestamp indicative of the time at which the primary content characterized by the first frequency component would be broadcasted onto the user terminal.

At step 110, the secondary content predetermined as being relevant to the primary content is stored in the repository. Typically, the relevance between the primary content and secondary content is determined based on the information characterizing the primary content (for example, the genre of the primary content, the language of the primary content), historical viewing preferences and the profile information of the user receiving the primary content, and the like.

Subsequently, at step 112, the primary content is broadcasted via preferably a satellite broadcasting transmitter, to the user terminal (for example, a television) accessible to the user, post identification of the first energy spectral density point determined to be having the highest spectral density and thus representing the highest frequency component (first frequency component) corresponding to the primary content, and post determination of the timestamp (first timestamp) indicative of the time at which the primary content characterized by the first frequency component would be broadcasted onto the user terminal.

During the broadcast of the primary content to the user terminal, the application server triggers a handheld device accessible to the user (the handheld device also referred to as a 'companion device' of the user), to track the broadcast of the primary content onto the user terminal and also verify the viewership of the broadcasted primary content. The handheld device (companion device) is specifically configured, preferably by the way of 'computer processor readable instructions' executed in the handheld device, to record in real-time the primary content played back on the user terminal. The handheld device is typically in proximity to the user terminal receiving and displaying the broadcasted primary content.

In accordance with the present disclosure, since the first frequency domain representation corresponding to the primary content has been determined prior to the scheduled broadcast, and since the first energy spectral density point having the highest spectral density (corresponding to the primary content) has been previously identified, in-turn leading to the identification of the highest frequency component (first frequency component) corresponding to the primary content and the timestamp (first timestamp) indicative of the time at which the primary content characterized by the first frequency component is broadcasted, the handheld device is triggered by the application server preferably only before the broadcast of the primary content characterized by the first frequency component. The handheld device is specifically configured (by the way of execution of computer processor readable instructions therein) to record in real-time at least the tonalities corresponding to the played back primary content characterized by the first frequency component. Further, the handheld device is configured to capture the tonalities of the primary content played back during the time specified by the first timestamp. The handheld device is further configured to transmit the recorded tonalities in real-time to the application server for verification of the viewership of the primary content.

At step 114, the tonalities captured from the primary content broadcasted onto the user terminal are analyzed (at the application server) using the Fast Fourier Transform (FFT) algorithm. The captured tonalities are subsequently represented in the form of a 'second frequency domain representation'. The second frequency domain representation corresponding to the captured tonalities is typically in the form of a spectrogram having 'two' axes, with various frequency components corresponding to the captured tonalities being represented on (preferably) a horizontal axis, and the timestamps denoting the respective time of broadcast of the captured tonalities characterized by each of the frequency components being represented (preferably) on a vertical axis. The 'second frequency domain representation' as was the case with the 'first frequency domain representation' signifies a plurality of spectral density points corresponding to the captured tonalities, the spectral density points representing the frequency components corresponding to the captured tonalities and the respective timestamps (the timestamps indicative of the time at which the captured tonalities characterized by each of the frequency components were originally broadcasted onto the user terminal).

Subsequently, at step 116, the spectral density points corresponding to the captured tonalities are analyzed and the second spectral density point having the highest spectral density corresponding to the captured tonalities is determined. The second spectral density point having the highest energy spectral density corresponding to the captured tonalities is also construed as the point representing the highest frequency component corresponding to the captured tonalities (referred to as 'second frequency component'). When the second energy spectral density point having the highest spectral density (corresponding to the captured tonalities) is determined, the point on the spectrogram having the second frequency component is also determined. Additionally, the corresponding timestamp (referred to as 'second timestamp') denoting the time at which the captured tonalities characterized by the second frequency component were played back on the user terminal, is also determined (step 118). The highest frequency component (second frequency component) corresponding to the captured tonalities and the respective timestamp (second timestamp) are subsequently stored in the repository.

Subsequently, at step 120, a secondary hash key representing the captured tonalities is created. For creating the secondary hash key, the second frequency component is combined with the second timestamp denoting the time at which the captured tonalities characterized by the second frequency component were played back on the user terminal, using well-known hash key generation techniques. The secondary hash key representing the captured tonalities is therefore regarded as a combination of the second frequency component (highest frequency component corresponding to the captured tonalities), and the second timestamp denoting the time at which the captured tonalities characterized by the second frequency component were played back on the user terminal.

Further, at step 122, the primary hash key corresponding to the primary content is compared with the secondary hash key corresponding to the captured tonalities. In accordance with the present disclosure, since the highest frequency component corresponding the primary content (i.e., the first frequency component) and the timestamp (first time stamp) indicative of the time at which the primary content characterized by the first frequency component is to be broadcasted, is predetermined (at steps 106 and 108), the handheld device is triggered just before (for example, a minute before) the time represented by the first timestamp, for capturing the tonalities corresponding to the broadcasted primary content.

Since the captured tonalities are also converted into the second frequency domain representation incorporating a plurality of spectral energy density points, followed by determination of the second spectral energy density point having the highest spectral density amongst the spectral energy density points corresponding to the captured tonalities, it is apparent that the first energy spectral density point identified as having the highest spectral density in the first frequency domain representation corresponding to the primary content, is same as the second energy spectral density point identified as having the highest spectral density in the second frequency domain representation corresponding to the captured tonalities.

Further, since the tonalities are captured from the user terminal broadcasting the primary content, by the way of triggering the handheld device just-in-time for capturing the tonalities that correspond to the broadcast of the primary content characterized by the first frequency component, the information utilized for generating the secondary hash key (the highest frequency component (second frequency component) corresponding to the captured tonalities and the timestamp (second timestamp) denoting the time at which the captured tonalities characterized by the second frequency component were played back on the user terminal) is exactly similar to the information (i.e., the first frequency component and the first timestamp) utilized for generating the primary hash key. The information utilized for generating the primary hash key and the secondary hash key are the same, albeit the primary hash key is generated prior to the broadcast of the primary content while the secondary hash key is generated using the captured tonalities corresponding to the broadcasted primary content. Further, since the information utilized for generating the primary hash key and the secondary hash key are the same, the primary hash key and the secondary hash key are also ought to be exactly similar.

The similarity between the energy spectral density point identified as having the highest spectral density in the frequency domain representation corresponding to the primary content, and the energy spectral density point identified as having the highest spectral density in the frequency domain representation corresponding to the captured tonalities, affirms that the captured tonalities were indeed a part of the primary content broadcasted onto the user terminal, in addition to providing a positive verification of the viewership of the primary content broadcasted onto the user terminal. Further, the primary hash key being exactly similar to the secondary hash key reaffirms that the primary content broadcasted onto the user terminal is the same as the tonalities subsequently captured from the user terminal, and also reconfirms the viewership of the primary content broadcasted onto the user terminal.

At step 124, subsequent to the similarity between the primary content and the captured tonalities being verified by the way of comparing the primary hash key (corresponding to the primary content) with the secondary hash key (corresponding to the captured tonalities) and by the way of determining whether the primary hash key is exactly similar to the secondary hash key, the secondary content identified as being relevant to the primary content (at step 110) is transmitted—only in the event that the primary hash key is determined to be exactly similar to the secondary hash key—to the handheld device of the user in the form of electromagnetic waves, preferably radio waves. Further, the user is selectively prompted to consume the secondary content and initiate any appropriate actions on the secondary content using the handheld device.

Referring to FIG. 2, there is shown a block diagram illustrating a system 200 for facilitating targeted secondary content delivery to a user. As illustrated in FIG. 2, the system 200 includes an application server 20 communicably coupled to a handheld device 22 (also referred to as a companion device) accessible to the user. Further, the system 200 also includes a user terminal 24 configured to receive the broadcasted primary content and present it to the user for consumption. Typically, the user terminal 24 is an electronic device, equipped with a user interface for receiving and presenting broadcast content. One of the typical examples of the user terminal is a television.

In accordance with the present disclosure, the application server 22 determines the primary content to be broadcasted to the user terminal 24 and stores the primary content in a repository 22A. Subsequently, the application server 22 analyzes the primary content using a Fast Fourier Transform (FFT) algorithm, and converts the primary content into a first frequency domain representation. The conversion of the primary content into the first frequency domain representation involves representing the first frequency domain representation in the form of a spectrogram having 'two' axes, with various frequency components corresponding to the primary content being represented on (preferably) a horizontal axis, and the timestamps denoting the time of broadcast of the primary content characterized by each of the frequency components.

In accordance with the present disclosure, the spectrogram generated by the application server 22 represents the frequency components corresponding to the primary content and the timestamps denoting the respective time at which the primary content characterized by each of the frequency components is to be broadcasted onto the user terminal. Subsequently, the application server 22 identifies a plurality of energy spectral density points from the spectrogram using the FFT algorithm.

In accordance with the present disclosure, the spectral density points forming the first frequency domain representation indicate the frequency components of the primary content and the respective timestamps (the timestamps indicative of the time at which the primary content characterized by each of the frequency components is broadcasted onto the user terminal). On the spectrogram, the points incorporating comparatively higher frequency components are represented as having comparatively higher energy spectral densities. Therefore, the application server 22 construes the higher energy spectral density points on the spectrogram as the points representing comparatively higher frequency components (in comparison to the other spectral density points on the spectrogram). Subsequently, the application server 22 stores the information identifying the energy spectral density points forming the first frequency domain representation corresponding to the primary content, i.e., the frequency components of the primary content and the respective timestamps representing the time of broadcast of the primary content characterized by each of the frequency components, in the repository 22A.

Subsequently, the application server 22 analyzes the energy spectral density points forming the first frequency domain representation corresponding to primary content, and determines a first energy spectral density point having the highest spectral density in comparison to the remaining energy spectral density points. The first energy spectral density point determined as having the highest spectral density is also considered as the point (on the spectrogram) representing the highest frequency component corresponding to the primary content. The highest frequency component corresponding to the primary content is termed as 'first frequency component' for ease of explanation. Subsequently, the timestamp corresponding to the highest frequency component (first frequency component) is also determined by the application server 22. The timestamp corresponding to the first frequency component is termed 'first timestamp' for ease of explanation. The first timestamp denotes the time of broadcast of the primary content characterized by the highest frequency component (first frequency component). The first frequency component and the first timestamp corresponding to the primary content (to be broadcasted onto the user terminal) are subsequently stored in the repository 22A.

The application server 22 combines the first frequency component with the first timestamp, and implements well-known hash key generation techniques to generate a primary hash key. Preferably, the primary hash key is of a predetermined length (for example, 16 bit, 32 bit). The primary hash key thus generated is a combination of the first frequency component (denoting the highest frequency component corresponding to the primary content) and the first timestamp (indicative of the time at which the primary component characterized by the first frequency component would be broadcasted). The primary hash key identifies the spectral energy density point on the spectrogram (corresponding to the primary content) having the highest energy density, in addition to pointing out to the highest frequency component (first frequency component) corresponding to the primary content and the timestamp indicative of the time at which the primary content characterized by the first frequency component would be broadcasted onto the user terminal.

Subsequently the application server 22 stores the secondary content predetermined as being relevant to the primary content, in the repository 22A. Typically, the relevance between the primary content and secondary content is determined/affirmed by the application server 22A based on the information characterizing the primary content (for example, the genre of the primary content, the language of the primary content), historical viewing preferences and the profile information of the user receiving the primary content, and the like.

In accordance with the present disclosure, the primary content is broadcasted (preferably using a satellite broadcasting transmitter) to the user terminal 24 (for example, a television), subsequent to the application server 22 identifying the first energy spectral density point determined as having the highest spectral density and thus representing the highest frequency component (first frequency component) corresponding to the primary content, and post determination of the timestamp (first timestamp) indicative of the time at which the primary content characterized by the first frequency component would be broadcasted onto the user terminal.

During the broadcast of the primary content to the user terminal 24, the application server 22 triggers a handheld device 26 accessible to the user (the handheld device 26 also referred to as a 'companion device' of the user), to track the broadcast of the primary content onto the user terminal 24 and also verify the viewership of the broadcasted primary content. The handheld device 26 (companion device) is specifically configured, preferably by the way of 'computer processor readable instructions' executed in the handheld device 26, to record in real-time the primary content played back on the user terminal 24. Further, the handheld device 24 is configured to capture the tonalities of the primary content played back during the time specified by the first timestamp. The handheld device 26 is typically in proximity to the user terminal 24 receiving and displaying the broadcasted primary content.

In accordance with the present disclosure, since the first frequency domain representation corresponding to the primary content has been determined prior to the scheduled broadcast, and since the first energy spectral density point having the highest spectral density (corresponding to the primary content) has been previously identified, in-turn leading to the identification of the highest frequency component (first frequency frequency component) corresponding to the primary content and the timestamp (first timestamp) indicative of the time at which the primary content characterized by the first frequency component is broadcasted, the handheld device 26 is triggered by the application server preferably only before the broadcast of the primary content characterized by the first frequency component. The handheld device 26 is specifically configured (by the way of execution of computer processor readable instructions therein) to record in real-time, at least the tonalities corresponding to the primary content played back on the user terminal and characterized by the first frequency component. Further, the handheld device 26 is configured to capture the tonalities of the primary content played back during the time specified by the first timestamp. The handheld device 26 is further configured to transmit the recorded tonalities in real-time to the application server 22 for verification of the viewership of the primary content.

Subsequently, the tonalities captured from the primary content broadcasted onto the user terminal 24 are analyzed by the application server 22 using the Fast Fourier Transform (FFT) algorithm. The captured tonalities are subsequently represented in the form of a 'second frequency domain representation'. The second frequency domain representation corresponding to the captured tonalities is typically in the form of a spectrogram having 'two' axes, with various frequency components corresponding to the captured tonalities being represented on (preferably) a horizontal axis, and the timestamps denoting the respective time of broadcast of the captured tonalities characterized by each of the frequency components being represented (preferably) on a vertical axis. The 'second frequency domain representation' as was the case with the 'first frequency domain representation' signifies a plurality of spectral density points corresponding to the captured tonalities, the spectral density points representing the frequency components corresponding to the captured tonalities and the respective timestamps (the timestamps indicative of the time at which the captured tonalities characterized by each of the frequency components were originally broadcasted onto the user terminal).

Subsequently, the application server 22 analyzes the spectral density points corresponding to the captured tonalities and determines a 'second spectral density point' having the highest spectral density amongst the spectral density points corresponding to the captured tonalities. The application server 22 construes the second spectral density point having the highest energy spectral density as the point representing the highest frequency component (referred to as 'second frequency component') corresponding to the captured tonalities. When the second energy spectral density point having the highest spectral density (corresponding to the captured tonalities) is determined by the application server 22, the point on the spectrogram having the highest frequency component (second frequency component) corresponding to the captured tonalities is also automatically identified. Additionally, the corresponding timestamp (referred to as 'second timestamp') denoting the time at which the captured tonalities characterized by the second frequency component were played back on the user terminal, is determined by the application server 22. The highest frequency component (second frequency component) corresponding to the captured tonalities and the respective timestamp (second timestamp) are subsequently stored in the repository 22A.

The application server 22 subsequently creates a secondary hash key representing the captured tonalities. For creating the secondary hash key, the application server 22 combines the second frequency component with the second timestamp denoting the time at which the captured tonalities characterized by the second frequency component were played back on the user terminal 24, using well-known hash key generation techniques. The secondary hash key representing the captured tonalities is therefore regarded as a combination of the second frequency component (highest frequency component corresponding to the captured tonalities), and the second timestamp denoting the time at which the captured tonalities characterized by the second frequency component were played back on the user terminal 24.

Further, the application server 22 compares the primary hash key corresponding to the primary content with the secondary hash key corresponding to the captured tonalities. In accordance with the present disclosure, since the highest frequency component corresponding the primary content (i.e., the first frequency component) and the timestamp (first time stamp) indicative of the time at which the primary content characterized by the first frequency component is to be broadcasted, is predetermined, the handheld device 26 is triggered just before (for example, a minute before) the time represented by the first timestamp, for capturing the tonalities corresponding to the broadcasted primary content.

Since the captured tonalities are also converted into the second frequency domain representation incorporating a plurality of spectral energy density points, followed by determination of the second spectral energy density point having the highest spectral density amongst the spectral energy density points corresponding to the captured tonalities, it is apparent that the first energy spectral density point identified as having the highest spectral density in the first frequency domain representation corresponding to the primary content, is same as the second energy spectral density point identified as having the highest spectral density in the second frequency domain representation corresponding to the captured tonalities.

Further, since the tonalities are captured from the user terminal 24 broadcasting the primary content, by the way of triggering the handheld device 26 just-in-time for capturing the tonalities that correspond to the broadcast of the primary content characterized by the first frequency component, the information utilized for generating the secondary hash key (information including the highest frequency component (second frequency component) corresponding to the captured tonalities and the tiniest amp (second timestamp) denoting the time at which the captured tonalities characterized by the second frequency component were played back on the user terminal 24) is exactly similar to the information (i.e., the first frequency component and the first timestamp) utilized for generating the primary hash key. The information utilized for generating the primary hash key and the secondary hash key are the same, albeit the primary hash key is generated prior to the broadcast of the primary content while the secondary hash key is generated using the captured tonalities corresponding to the broadcasted primary content. Further, since the information utilized for generating the primary hash key and the secondary hash key are the same, the primary hash key and the secondary hash key are also ought to be exactly similar.

The similarity between the energy spectral density point identified as having the highest spectral density in the frequency domain representation corresponding to the primary content, and the energy spectral density point identified as having the highest spectral density in the frequency domain representation corresponding to the captured tonalities, affirms that the captured tonalities were indeed a part of the primary content broadcasted onto the user terminal, in addition to providing a positive verification of the viewership of the primary content broadcasted onto the user terminal 24. Further, the primary hash key being exactly similar to the secondary hash key reaffirms that the primary content broadcasted onto the user terminal is the same as the tonalities subsequently captured from the user terminal 24, and also reconfirms the viewership of the primary content broadcasted onto the user terminal 24.

Subsequently, the application server 22 verifies the similarity between the primary content and the captured tonalities by the way of comparing the primary hash key (corresponding to the primary content) with the secondary hash key (corresponding to the captured tonalities) and by the way of determining whether the primary hash key is exactly similar to the secondary hash key. In the event that the primary hash key is determined to be exactly similar to the secondary hash key, the application server 22 transmits the secondary content relevant to the primary content, to the handheld device 26 of the user in the form of electromagnetic waves, preferably radio waves. Further, the application server 22 selectively prompts the user to consume the secondary content and initiate any appropriate actions on the secondary content using the handheld device 26.

The present disclosure envisages a computer readable non-transitory storage medium having computer readable instructions stored thereupon. The computer readable instructions when executed by a computer processor, cause the computer processor to perform the following steps:

- store, in a repository, a primary content to be broadcasted to a user terminal accessible to a user;
- transmit the primary content stored in the repository to an application server;
- implement a Fast Fourier Transform (FFT) algorithm on the primary content, and convert the primary content into a first frequency domain representation corresponding to the primary content;
- identify a plurality of energy spectral density points from the first frequency domain representation, and store the energy spectral density points in the repository;
- identify a first energy spectral density point having highest spectral density amongst the plurality of energy spectral density points corresponding to the first frequency domain representation;
- determine a first frequency component corresponding to the first energy spectral density point, and further determine a first timestamp indicative of a time at which the primary content characterized by the first frequency component would be broadcasted onto the user terminal;
- generate a primary hash key representing the first frequency component and the first timestamp, and link the primary hash key with the primary content stored in the repository;
- store in the repository, a secondary content predetermined as being relevant to the primary content, and link the secondary content to the primary content stored in the repository, and to the primary hash key;
- trigger a pre-configured handheld device in proximity to the user terminal and accessible to the user, during a broadcast of the primary content onto the user terminal, to capture tonalities corresponding to the primary content, at least during the time denoted by the first timestamp;
- analyze the tonalities captured by the handheld device, and convert captured tonalities into a second frequency domain representation, the second frequency domain representation incorporating a plurality of energy spectral density points corresponding to the captured tonalities;
- identify from the second frequency domain representation, a second energy spectral density point having highest spectral density amongst the plurality of energy spectral density points corresponding to the captured tonalities;
- determine a second frequency component corresponding to the second energy spectral density point, and further determine a second timestamp indicative of a time at which the captured tonalities characterized by the second frequency component were played back on the user terminal;
- generate a secondary hash key representing the second frequency component frequency and the second timestamp;
- compare the secondary hash key with the primary hash key, and determine whether the secondary hash key is similar to the primary hash key;
- transmit the secondary content linked to the primary hash key, onto the handheld device, in an event that the secondary hash key is determined to be similar to the primary hash key, and prompt the user to respond to the secondary content via the handheld device.

The computer readable instructions contained in the computer readable non-transitory storage medium, when executed by the computer processor, further cause the computer processor to:
- create a time-frequency spectrogram representing a plurality of frequency components corresponding to the primary content, and respective timestamps indicative of the time at which the primary content characterized by each of the frequency components is broadcasted onto the user terminal;
- classify the first frequency component corresponding to the first energy spectral density point, as highest frequency component corresponding to the primary content;
- classify the second frequency component corresponding to the second energy spectral density point as highest frequency component corresponding to the captured tonalities;
- link the secondary content with the primary content and the primary hash key;
- trigger the handheld device at least prior to the time at which the primary content characterized by the first frequency component is broadcasted onto the user terminal; and
- transmit the secondary content to the user terminal via electromagnetic waves.

TECHNICAL ADVANTAGES

The technical advantages envisaged by the present disclosure include the realization of a system and method that provides for active engagement of users by the way of transmitting relevant secondary content in a target-oriented manner to the companion device(s) of the users. Further, the present disclosure transmits the secondary content in a seamless, unobtrusive manner. Further, the present disclosure teaches transmitting only the secondary content relevant to the primary content broadcasted on the television. The secondary content is transmitted only after the viewership of the primary content is positively verified. Further, the secondary content is transmitted and provided for user's view in such a way that the primary content viewing experience of the user is never compromised/obstructed.

What is claimed is:

1. A method for providing targeted secondary content delivery to a user, the method comprising the following steps:
   - storing in a repository, a primary content to be broadcast to a user terminal accessible to the user;
   - transferring the primary content stored in the repository to an application server, and implementing a Fast Fourier Transform (FFT) algorithm on the primary content, and converting the primary content into a first frequency domain representation;
   - identifying, using the application server, a plurality of energy spectral density points from the first frequency domain representation, and storing the energy spectral density points in the repository;
   - identifying, using the application server, a first energy spectral density point having highest spectral density amongst the plurality of energy spectral density points incorporated into the first frequency domain representation, and determining a first frequency component corresponding to the first energy spectral density point, and a first timestamp indicative of a time at which the primary content characterized by the first frequency component would be broadcasted onto the user terminal;
   - generating, at the application server, a primary hash key representing the first frequency component and the first timestamp, and linking the primary hash key with the primary content stored in the repository;
   - storing in the repository, a secondary content predetermined to be relevant to the primary content, and linking the secondary content to the primary content and the primary hash key;
   - broadcasting the primary content onto the user terminal, and triggering a pre-configured handheld device in proximity to the user terminal and accessible to the user, to capture tonalities corresponding to the primary content played back on the user terminal at least during the time denoted by the first timestamp;
   - analyzing, at the application server, the tonalities captured by the handheld device, and converting captured tonalities into a second frequency domain representation, the second frequency domain representation incorporating a plurality of energy spectral density points corresponding to the captured tonalities;
   - identifying from the second frequency domain representation, a second energy spectral density point having highest spectral density amongst the plurality of energy spectral density points corresponding to the captured tonalities;
   - determining a second frequency component corresponding to the second energy spectral density point, and determining a second timestamp indicative of a time at which the captured tonalities characterized by the second frequency component were played back on the user terminal;
   - generating a secondary hash key by combining the second frequency component and the second timestamp;
   - comparing the secondary hash key with the primary hash key, and determining whether the secondary hash key is similar to the primary hash key;
   - transmitting the secondary content linked to the primary hash key, onto the handheld device, only in an event that the secondary hash key is determined to be similar to the primary hash key, and prompting the user to respond to the secondary content via the handheld device.

2. The method as claimed in claim 1, wherein the step of converting the primary content into a corresponding frequency domain representation, further includes the step of creating a time-frequency spectrogram representing a plurality of frequency components corresponding to the primary content, and respective timestamps indicative of the time at which the, primary content characterized by each of the frequency components is broadcasted onto the user terminal.

3. The method as claimed in claim 1, wherein the step of determining a first frequency component corresponding to the first energy spectral density point, further includes the step of classifying the first frequency component as highest frequency component corresponding to the primary content.

4. The method as claimed in claim 1, wherein the step of determining a second frequency component corresponding to the second energy spectral density point, further includes the step of classifying the second frequency component as highest frequency component corresponding to the captured tonalities.

5. The method as claimed in claim 1, wherein the step of identifying a secondary content relevant to the primary content to be broadcast to the user, further includes the step of linking identified secondary content with the primary hash key.

6. The method as claimed in claim 1, wherein the step of triggering a pre-configured handheld device in proximity to the user terminal, further includes the step of triggering the handheld device at least prior to the time at which the primary content characterized by the first frequency component is broadcasted.

7. The method as claimed in claim 1, wherein the step of transmitting the secondary content onto the handheld device, further includes the step of transmitting the secondary content to the handheld device in the form of electromagnetic waves.

8. A system for providing targeted secondary content delivery to a user, the system comprising a user terminal accessible to the user, an application server communicably coupled to the user terminal, and a handheld device accessible to the user and communicably coupled to the application server, wherein:

the application server further includes a repository, the repository configured to store a primary content and a secondary content predetermined as being relevant to the primary content the application server configured to:

implement a Fast Fourier Transform (FFT) algorithm on the primary content, and convert the primary content into a first frequency domain representation incorporating a plurality of energy spectral density points corresponding to the primary content;

identify amongst the plurality of energy spectral density points corresponding to the first frequency domain representation, a first energy spectral density point having highest spectral density;

determine a first frequency component corresponding to the first energy spectral density point, and a first timestamp indicative of a time at which the primary content characterized by the first frequency component would be broadcasted onto the user terminal;

generate a primary hash key representing the first frequency component and the first timestamp;

link the primary hash key with the primary content and the secondary content stored in the repository;

broadcast the primary content onto the user terminal, and trigger the handheld device to capture tonalities corresponding to broadcasted primary content, at least during the time denoted by the first timestamp;

analyze the tonalities captured by the handheld device, and convert captured tonalities into a second frequency domain representation, the second frequency domain representation incorporating a plurality of energy spectral density points corresponding to the captured tonalities;

identify from the second frequency domain representation corresponding to the captured tonalities, a second energy spectral density point having highest spectral density;

determine a second frequency component corresponding to the second energy spectral density point, and further determine a second timestamp indicative of a time at which the captured tonalities characterized by the second frequency component were played back on the user terminal;

generate a secondary hash key representing the second broadcasting frequency and the second timestamp;

compare the secondary hash key with the primary hash key, and determine whether the secondary hash key is similar to the primary hash key;

transmit the secondary content linked to the primary hash key, onto the handheld device, only in an event that the secondary hash key is determined to be similar to the primary hash key, and prompt the user to respond to the secondary content via the handheld device.

9. The system as claimed in claim 8, wherein the application server is further configured to create a time-frequency spectrogram representing a plurality of frequency components corresponding to the primary content and respective timestamps indicative of the time at which the primary content characterized by each of the frequency components is broadcasted onto the user terminal.

10. The system as claimed in claim 8, wherein the application server is further configured to:

classify the first frequency component corresponding to the first energy spectral density point as highest frequency component corresponding to the primary content; and classify the second frequency component corresponding to the second energy spectral density point as highest frequency component corresponding to the captured tonalities.

11. The system as claimed in claim 8, wherein the repository is configured to store the plurality of energy spectral density points incorporated by the frequency domain representation corresponding to the primary content, the repository further configured to store the plurality of energy spectral density points incorporated by the second frequency domain representation corresponding to the captured tonalities.

12. A computer readable non-transitory storage medium having computer readable instructions stored thereupon, the computer readable instructions when executed by a computer processor, cause the computer processor to:

store, in a repository, a primary content to be broadcasted to a user terminal accessible to a user;

transmit the primary content stored in the repository to an application server;

implement a Fast Fourier Transform (FFT) algorithm on the primary content, and convert the primary content into a first frequency domain representation corresponding to the primary content;

identify a plurality of energy spectral density points from the first frequency domain representation, and store the energy spectral density points in the repository;

identify a first energy spectral density point having highest spectral density amongst the plurality of energy spectral density points corresponding to the first frequency domain representation;

determine a first frequency component corresponding to the first energy spectral density point, and further determine a first timestamp indicative of a time at which the primary content characterized by the first frequency component would be broadcasted onto the user terminal;

generate a primary hash key representing the first frequency component and the first timestamp, and link the primary hash key with the primary content stored in the repository;

store in the repository, a secondary content predetermined as being relevant to the primary content, and link the secondary content to the primary content stored in the repository, and to the primary hash key;

trigger a pre-configured handheld device in proximity to the user terminal and accessible to the user, during a broadcast of the primary content onto the user terminal, to capture tonalities corresponding to the primary content, at least during the time denoted by the first timestamp;

analyze the tonalities captured by the handheld device, and convert captured tonalities into a second frequency domain representation, the second frequency domain representation incorporating a plurality of energy spectral density points corresponding to the captured tonalities;

identify from the second frequency domain representation, a second energy spectral density point having highest spectral density amongst the plurality of energy spectral density points corresponding to the captured tonalities;

determine a second frequency component corresponding to the second energy spectral density point, and further determine a second timestamp indicative of a time at which the captured tonalities characterized by the second frequency component were played back on the user terminal;

generate a secondary hash key representing the second frequency component frequency and the second timestamp;

compare the secondary hash key with the primary hash key, and determine whether the secondary hash key is similar to the primary hash key;

transmit the secondary content linked to the primary hash key, onto the handheld device, in an event that the secondary hash key is determined to be similar to the primary hash key, and prompt the user to respond to the secondary content via the handheld device.

13. The computer readable non-transitory storage medium as claimed in claim 12, wherein the computer readable instructions, when executed by the processor, cause the computer processor to:

create, a time-frequency spectrogram representing a plurality of frequency components corresponding to the primary content, and respective timestamps indicative of the time at which the primary content characterized by each of the frequency components is broadcasted onto the user terminal;

classify the first frequency component corresponding to the first energy spectral density point, as highest frequency component corresponding to the primary content;

classify the second frequency component corresponding to the second energy spectral density point as highest frequency component corresponding to the captured tonalities;

link the secondary content with the primary content and the primary hash key;

trigger the handheld device at least prior to the time at which the primary content characterized by the first frequency component is broadcasted onto the user terminal; and transmit the secondary content to the user terminal via electromagnetic waves.

* * * * *